US008305714B2

(12) United States Patent  
Suzuki et al.

(10) Patent No.: US 8,305,714 B2  
(45) Date of Patent: Nov. 6, 2012

(54) VOICE-COIL MOTOR WITH VOICE COILS CONFIGURED ORIENTED IN THE SAME DIRECTION AND SUBSTANTIALLY OVERLAYED TO REDUCE HEAD VIBRATIONS IN A DISK DRIVE

(75) Inventors: Kenji Suzuki, Kanagawa (JP); Hiromitsu Masuda, Kanagawa (JP); Eiji Soga, Kanagawa (JP); Mutsuro Ohta, Kanagawa (JP); Takaaki Deguchi, Kanagawa (JP)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 0 days.

(21) Appl. No.: 12/978,320

(22) Filed: Dec. 23, 2010

(65) Prior Publication Data

US 2012/0162827 A1 Jun. 28, 2012

(51) Int. Cl.  
*G11B 5/55* (2006.01)

(52) U.S. Cl. ....................................... 360/265
(58) Field of Classification Search .............. 360/265, 360/264.7  
See application file for complete search history.

(56) References Cited

U.S. PATENT DOCUMENTS

| | | | |
|---|---|---|---|
| 4,669,013 A | 5/1987 | Seranton et al. | |
| 4,692,999 A | 9/1987 | Frandsen | |
| 5,041,935 A * | 8/1991 | Aruga et al. | 360/264.9 |
| 5,448,437 A | 9/1995 | Katahara | |
| 5,764,440 A | 6/1998 | Forbord | |
| 5,991,124 A | 11/1999 | Forbord | |
| 6,104,581 A | 8/2000 | Huang et al. | |
| 6,225,712 B1 * | 5/2001 | Miyamoto et al. | 310/15 |
| 6,226,156 B1 | 5/2001 | Kasetty et al. | |
| 6,633,457 B1 | 10/2003 | Lin et al. | |
| 7,038,886 B1 | 5/2006 | Chang et al. | |
| 7,675,714 B1 | 3/2010 | Yucesan et al. | |
| 2002/0036867 A1 | 3/2002 | Hong et al. | |
| 2002/0039260 A1 | 4/2002 | Kilmer | |
| 2005/0162782 A1 | 7/2005 | Tsuda et al. | |
| 2005/0283971 A1 | 12/2005 | Erpelding | |
| 2007/0205674 A1 | 9/2007 | Tseng et al. | |
| 2008/0007862 A1 | 1/2008 | Hayakawa et al. | |
| 2008/0291563 A1 | 11/2008 | Obregon et al. | |
| 2009/0015968 A1 | 1/2009 | Xu et al. | |

OTHER PUBLICATIONS

Lee, Haeng-Soo et al., "VCM Design to Improve Dynamic Performance of Actuator in a Disk Drive", *VCM design to improve dynamic performance of actuator in a disk drive*, Haeng-800 Lee et. at., *Asia-Pacific Magnetic Recording Conference*Publication Date: Aug. 16-19, 2004, pp. 1-1. http://ieeexplore.ieee.org/starnp/statTlp._jsp?tn=&arnurnbe_r=_15.

Suzuki, Kenji et al., "VCM design with round coil and axe-shaped magnet for hard disk drive actuator", *VCM design with round coil and axe-shaped magnet for hard disk drive actuator*, Kenji Suzuki et. al., Published date: Dec. 1, 2006, pp. 1-1. http://www.springerlink.com/content/617r436426483728/.

* cited by examiner

*Primary Examiner* — Allen Heinz

(57) ABSTRACT

A voice-coil motor (VCM) with voice coils configured to reduce vibrations of a head when data is accessed on a disk in a disk drive. The VCM includes at least one VCM magnet and a voice-coil assembly. The voice-coil assembly includes a first voice coil and at least a second voice coil. The first voice coil is disposed in proximity to a magnetic pole of the at least one voice-coil-motor magnet. The second voice coil is disposed in close proximity to the first voice coil such that the first voice coil substantially overlays the second voice coil. The first voice coil and the second voice coil are configured to reduce vibrations of the head when data is accessed on a disk in the disk drive. A rotary actuator including the voice coils and a disk drive including the VCM are also provided.

25 Claims, 5 Drawing Sheets

VOICE-COIL MOTOR WITH VOICE COILS CONFIGURED ORIENTED IN THE SAME DIRECTION AND SUBSTANTIALLY OVERLAYED TO REDUCE HEAD VIBRATIONS IN A DISK DRIVE

TECHNICAL FIELD

Embodiments of the present invention relate generally to the field of disk drives, and voice-coil motors (VCMs) and rotary actuators of disk drives.

BACKGROUND

Disk drives are known in the art that use various kinds of disks, such as: optical disks, magneto-optical disks, flexible magnetic-recording disks, and similar disks of data-storage devices. In particular, hard-disk drives (HDDs) have been widely used as indispensable data-storage devices for computer systems. Moreover, HDDs have found widespread application to motion picture recording and reproducing apparatuses, car navigation systems, cellular phones, and similar devices, in addition to the computers, because of their outstanding information-storage characteristics.

In standard HDDs, a rotary actuator having a magnetic-recording head mounted at one end is driven in rotation about a pivot shaft of the rotary actuator; and, by this means, the magnetic-recording head can be positioned at any radial position over a magnetic-recording disk so that writing data to, and reading data from, the magnetic-recording disk can be performed. A voice coil is mounted at the other end of the rotary actuator, and the drive force for rotating the rotary actuator is produced by means of a voice-coil motor (VCM), which includes a VCM magnet that is secured to the disk enclosure (DE) of the HDD. The VCM has a structure in which the voice coil is disposed between yokes made of a soft magnetic material in order to form a magnet for generating magnetic flux and a magnetic circuit.

Against the background of the "information society", in which there is a need for greater information-storage capacity in HDDs, attempts are being made to improve the positioning accuracy of magnetic-recording heads and to produce HDDs which are able to record at higher areal density by reducing vibration excitation forces inside HDDs and attenuating disturbances, which have larger affects as the control bandwidth of the rotary actuator increases with the demand for higher areal density. Conventional mechanisms for positioning rotary actuators are those in which the magnetic-recording head at the distal end of the rotary actuator is driven in rotation and placed in a specific position by applying a voice-coil current to the voice coil of the VCM. Increases in the control bandwidth in head positioning systems involving a VCM has been achieved by making the rotary actuator more rigid, which increases the main resonance frequency, because the control bandwidth stems largely from the main resonance frequency of the rotary actuator. However, even larger increases in the control bandwidth are difficult to achieve by further increasing the rigidity of the rotary actuator. Therefore, efforts have been made to reduce the phase lag produced by the filter of the hard-disk controller (HDC) for attenuating resonance in order to maintain stable control, by reducing out-of-plane structural resonance, such as torsional resonance and bending resonance. In view of this, structures for attenuating structural resonance have been proposed in the art, as next described.

In a first example known in the art, a structure for minimizing track-positioning errors of the magnetic-recording head that are caused by dynamic mechanical deformation of the HDD suspension and magnetic-recording head provides an attenuation mechanism on the voice coil and voice-coil support part. However, the HDD including the attenuation mechanism on the voice coil and voice-coil support part does not include a structure which reduces the actual excitation force of the resonance in the VCM.

In a second example known in the art, a HDD includes two voice coils in parallel in the lengthwise direction of the rotary actuator, and includes a VCM that does not induce main resonance that adversely affects the increase in control bandwidth. In the track following mode for positioning the magnetic-recording head at a specific track on the magnetic-recording disk, current is applied to the second voice coil; while in the track seek mode for moving the magnetic-recording head to a specific track, current is applied to the first voice coil. Moreover, the two voice coils are not parallel to the pivot shaft of the rotary actuator, and current is only applied to one of the voice coils in each of the two modes.

In a third example known in the art, in order to increase the bandwidth of the rotary actuator in a HDD, the HDD may employ two modes, namely a track following mode for positioning the magnetic-recording head and a track seek mode for moving to a specific track; and, the voltage is divided between two voice coils during track following for positioning the magnetic-recording head, such that the main resonance frequency that adversely affects increases in control bandwidth is not excited. The orientations of the currents applied to the two voice coils in the track following mode are opposing, and therefore the rotational moment generated per unit current is reduced, and a large current is required, which leads to increased electrical power consumption.

These designs suggest that engineers and scientists engaged in HDD manufacturing and development have an on-going interest in the design of HDDs that control the motion of the rotary actuator that bears the magnetic-recording head in accessing data written to, and read back from, the magnetic-recording disk to meet the rising demands of the marketplace for increased data-storage capacity, performance, and reliability of HDDs.

SUMMARY

Embodiments of the present invention include a voice-coil motor (VCM) with voice coils configured to reduce vibrations of a head when data is accessed on a disk in a disk drive. The VCM includes at least one VCM magnet, and a voice-coil assembly. The voice-coil assembly includes a first voice coil and at least a second voice coil. The first voice coil is disposed in proximity to a magnetic pole of the at least one voice-coil-motor magnet. The second voice coil is disposed in close proximity to the first voice coil such that the first voice coil substantially overlays the second voice coil. The first voice coil and the second voice coil are configured to reduce vibrations of the head when data is accessed on a disk in the disk drive. Embodiments of the present invention also include a rotary actuator that includes voice coils, and a disk drive that includes the VCM.

DESCRIPTION OF THE DRAWINGS

The accompanying drawings, which are incorporated in and form a part of this specification, illustrate embodiments of the invention and, together with the description, serve to explain the embodiments of the invention.

Figure 1:
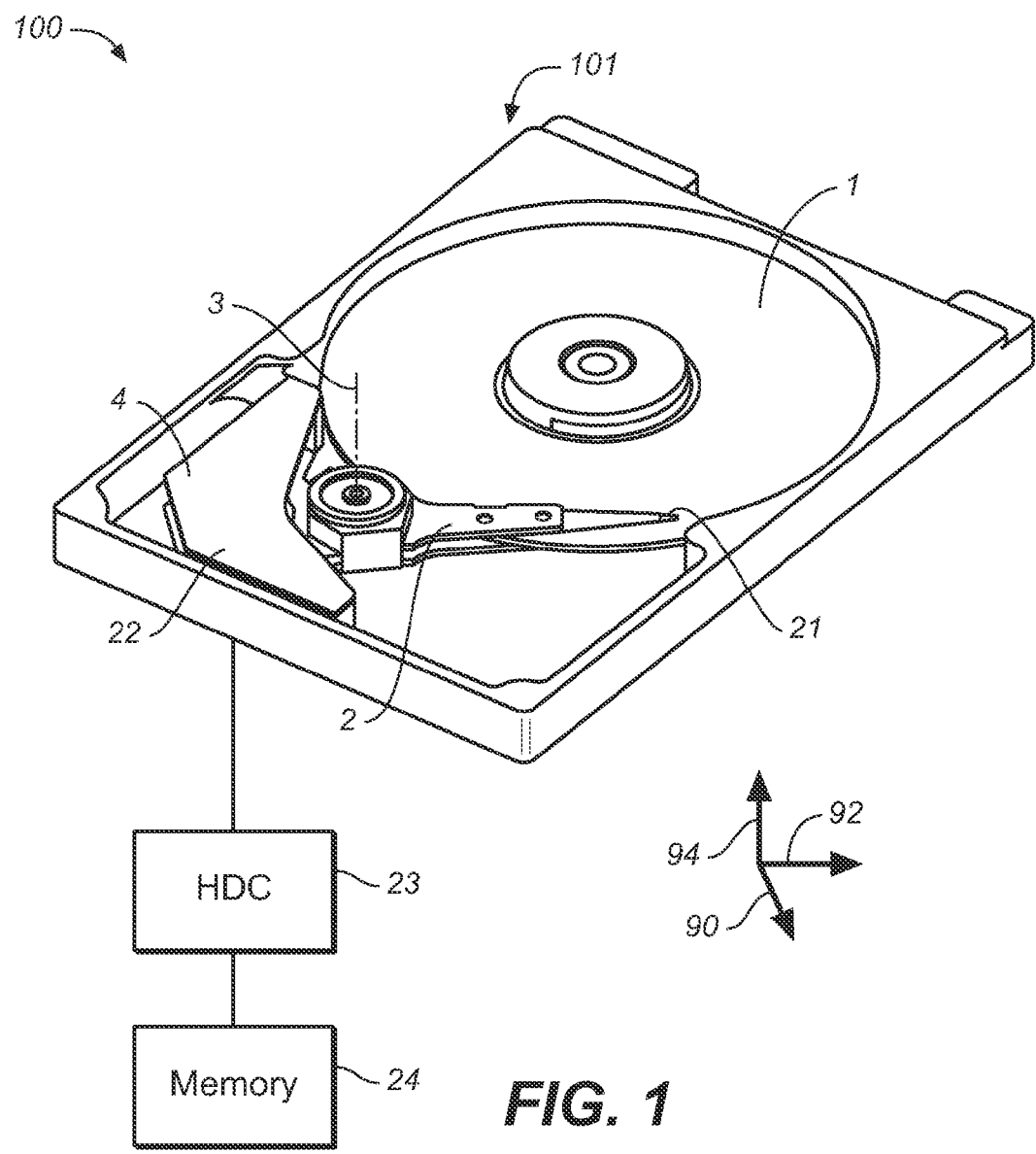
FIG. 1 is a perspective view of a hard-disk drive (HDD), in accordance with one or more embodiments of the present invention.

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be noted that embodiments of the present invention may be practiced without these specific details. In other instances, well known methods, procedures, and components have not been described in detail as not to unnecessarily obscure embodiments of the present invention. Throughout the drawings, like components are denoted by like reference numerals, and repetitive descriptions are omitted for clarity of explanation if not necessary.
PHYSICAL DESCRIPTION OF EMBODIMENTS OF THE PRESENT INVENTION FOR A VOICE-COIL MOTOR WITH VOICE COILS CONFIGURED TO REDUCE HEAD VIBRATIONS IN A DISK DRIVE With relevance to embodiments of the present invention, the voice-coil motor (VCM), ideally, generates only a force that causes rotation of the rotary actuator. However, a force parallel to the pivot shaft may be generated because of the structure, shape, and assembly variations of the VCM. The force parallel to the pivot shaft acts in a direction perpendicular to the movement plane of the voice coil; and, therefore, the force parallel to the pivot shaft is referred to by the term of art, "out-of-plane excitation force." The out-of-plane excitation force is produced when there is a component in the magnetic field emanating from the VCM magnet that is parallel to the plane in which a voice coil lies. The out-of-plane excitation force has the greatest effect at the outer peripheral portion of the voice coil, which is distal from the pivot shaft that constitutes the rotational center of the rotary actuator. The out-of-plane excitation force generates torque at the center of rotation of the rotary actuator. This torque constitutes a source of noise as the resonant frequency, associated with bending resonance and torsional resonance of the coils, matches the resonant frequency of the base and cover; and, this torque causes settling vibration in the rotary actuator, which may be communicated to the magnetic-recording head coupled to the actuator. The settling vibration of the rotary actuator leads to impaired performance of the hard-disk drive (HDD), such that the positioning accuracy of the magnetic-recording head is impaired, which presents an obstacle to increasing the data-storage capacity of the HDD.

Embodiments of the present invention provide stable positioning of the magnetic-recording head with reduced noise and settling vibration, by providing a system with suppression of the excitation of structural resonance, such as out-of-plane torsion and bending of the rotary actuator, due to the out-of-plane excitation force exerted on the coils of the VCM in the HDD. Thus, embodiments of the present invention provide a large, data-storage capacity HDD in which the out-of-plane excitation force acting on voice coils is reduced, and the positioning accuracy of the magnetic-recording head on a specific recording track is increased by suppressing the bending resonance and torsional resonance of the coils, and consequently vibration of the magnetic-recording head.

In accordance with embodiments of the present invention, a voice-coil assembly of a VCM, which is the drive source of a rotary actuator for positioning a magnetic-recording head that writes data to, and reads data from, the recording surface of a magnetic-recording disk, includes a first voice coil and at least a second voice coil. In accordance with embodiments of the present invention, the coil axes of the first and second voice coils are disposed parallel to the pivot shaft of the rotary actuator. In accordance with embodiments of the present invention, the orientations of the currents that are applied to the first and second coils are about the same; but, the magnitudes of current in the first and second coils are in different proportions such that out-of-plane structural resonances, namely torsion and bending of the rotary actuator, are reduced. Thus, embodiments of the present invention reduce the excitation of out-of-plane structural resonance, namely torsion and bending, which is produced by the out-of-plane excitation force generated in the coils of the VCM in a HDD. Thus, embodiments of the present invention provide a HDD in which noise and settling vibration can be reduced, and in which the magnetic-recording head can be stably positioned.

With reference now to FIG. 1, in accordance with embodiments of the present invention, a perspective view 100 showing an example embodiment of HDD 101 is shown. In the subsequent description of HDD 101, rotary actuator 2 and VCM 4, embodiments of the present invention incorporate within the environments of HDD 101, rotary actuator 2 and VCM 4, without limitation thereto, the subsequently described embodiments of the present invention for a voice-coil assembly 22 including first and at least second voice coils 22-1 and 22-2, which are suitable for incorporation within the environments of HDD 101, rotary actuator 2 and VCM 4.

Moreover, HDD 101 is but one representative environment for embodiments of the present invention, as embodiments of the present invention also encompass within their spirit and scope other types of disk drives, for example, such as: optical drives that include one or more optical disks, magneto-optical drives that include one or more magneto-optical disks, floppy-disk drives that include one or more flexible magnetic-recording disks, and similar disk data-storage devices. Thus, embodiments of the present invention described in terms of a magnetic-recording head and a magnetic-recording disk may also apply more generally to other types of heads and disks used in disk drives, more generally; and, the embodiments of the present invention described in terms of a hard-disk controller (HDC) may also apply more generally to other types of disk controllers for such disk drives. Furthermore, although rotary actuator 2 and VCM 4 are shown in the environment of HDD 101, this is by way of example without limitation thereto, as other embodiments of the present invention encompass within their spirit and scope rotary actuators and VCMs that may be used in other types of disk drives, for example, those listed above.

With further reference to FIG. 1, in accordance with embodiments of the present invention, HDD 101 includes at least one head-gimbal assembly (HGA) including a magnetic-recording head 21, a lead-suspension attached to the magnetic-recording head 21, and a load beam attached to a slider, which includes the magnetic-recording head 21 at a distal end of the slider; the slider is attached at the distal end of the load beam to a gimbal portion of the load beam. HDD 101 also includes at least one magnetic-recording disk 1 rotatably mounted on a spindle and a drive motor (not shown) mounted in a disk-enclosure (DE) base and attached to the spindle for rotating the magnetic-recording disk 1. The magnetic-recording head 21 that includes a write element, a so-called writer, and a read element, a so-called reader, is disposed for respectively writing and reading information, referred to by the term of art, "data," stored on the magnetic-recording disk 1 of HDD 101. The magnetic-recording disk 1, or a plurality (not shown) of magnetic-recording disks, may be affixed to the spindle by a disk clamp. HDD 101 further includes: a rotary actuator 2 that is coupled with the HGA and includes a carriage; a VCM 4 that includes a voice-coil assembly 22, which is integrated with the rotary actuator 2 through attachment to the carriage, and the VCM magnets 42-1 and 42-2 (see FIG. 3); the VCM 4 is configured to move the rotary actuator 2 and HGA to access portions of the magnetic-recording disk 1, as the carriage of the rotary actuator 2 is mounted on a pivot shaft 3 with an interposed pivot-bearing assembly. As used herein, "access" is a term of art that refers to operations in seeking a data track of a magnetic-recording disk and positioning a magnetic-recording head on the data track for both reading data from, and writing data to, a magnetic-recording disk. HDD 101 may also include a load-unload ramp for the HGA that is configured to engage a tongue of the HGA at the far distal end of HGA when rotary actuator 2 is refracted from a position for flying the magnetic-recording head 21 in proximity with the magnetic-recording disk 1.

With further reference to FIG. 1, in accordance with embodiments of the present invention, a triad of vectors 90, 92 and 94 is provided. The triad of vectors 90, 92 and 94 is right handed. The triad of vectors 90, 92 and 94 provides a reference for determining the orientation of other drawings of embodiments of the present invention with respect to FIG. 1. The terms of art, "bottom" and "top," refer to structures and sides of structures that are oriented perpendicular to vector 94; "bottom" refers to sides facing the DE base, or structures disposed below the center plane of HDD 101 that is parallel to the plane of the magnetic-recording disk 1; and "top", to sides facing the DE cover (not shown), or structures disposed above the center plane of HDD 101. The term of art, "upward" refers to entities aligned in the same direction and sense of the vector 94; and, the term of art, "downward" to entities aligned in the opposite direction and sense of the vector 94. The term of art, "vertical" refers to entities aligned parallel to the vector 94; and, the term of art, "horizontal" to entities aligned perpendicular to the vector 94. The vector 92 is oriented parallel to a center line of the rotary actuator 2; and, the term of art "distal" refers to structures located at the end of the rotary actuator 2 where the magnetic-recording head 21 is located; and, "proximal", to the end of the rotary actuator 2 opposite the distal end, for example, to where the voice-coil assembly 22 is located. The vector 90 is oriented orthogonally to vectors 92 and 94; and, the term of art "right" refers to the right of the center line of the rotary actuator 2 when viewed in the positive direction of vector 92 when moving away from the center line in the positive direction of vector 90; and, the term of art "left" refers to the left of the center line of the rotary actuator 2 when viewed in the positive direction of vector 92 when moving away from the center line in the direction opposite to the positive direction of vector 90.

With further reference to FIG. 1, in accordance with embodiments of the present invention, electrical signals, for example, voice-coil currents supplied to the voice-coil assembly 22 of VCM 4, write signals to and read signals from the magnetic-recording head 21, are provided by a flexible cable. Interconnection between the flexible cable and the magnetic-recording head 21 may be provided by an arm-electronics (AE) module, which may have an on-board pre-amplifier for the read signal, as well as other read-channel and write-channel electronic components. The flexible cable is coupled to an electrical-connector block, which provides electrical communication through electrical feedthroughs provided by the DE base. The DE base, also referred to as a casting, depending upon whether the DE base is cast, in conjunction with a DE cover (not shown in FIG. 1) provides a sealed, protective DE for the information storage components of HDD 101.

With further reference to FIG. 1, in accordance with embodiments of the present invention, other electronic components (not shown), including a hard-disk controller (HDC)/microprocessor unit (MPU) and servo electronics including a digital-signal processor (DSP), provide electrical signals to the drive motor, the voice-coil assembly 22 of VCM 4 and the magnetic-recording head 21. The electrical signal provided to the drive motor enables the drive motor to spin providing a torque to the spindle which is in turn transmitted to the magnetic-recording disk 1 that is affixed to the spindle by the disk clamp; as a result, the magnetic-recording disk 1 spins. The spinning magnetic-recording disk 1 creates an airflow including an air-stream, and a cushion of air that acts as an air bearing on which the air-bearing surface (ABS) of the slider rides so that the slider flies in proximity with the surface of the magnetic-recording disk 1 with minimal contact between the slider and the magnetic-recording disk 1 in which information is recorded. The electrical signal provided to the voice-coil assembly 22 of VCM 4 enables the magnetic-recording head 21 to access a track on which information is recorded. Thus, the rotary actuator 2 swings through an arc which enables magnetic-recording head 21 to access various tracks on the magnetic-recording disk 1. Information is stored on the magnetic-recording disk 1 in a plurality of concentric tracks (not shown) arranged in sectors on the magnetic-recording disk 1. Correspondingly, each track is composed of a plurality of sectored track portions. Each sectored track portion is composed of recorded data and a header containing a servo-burst-signal pattern, for example, an ABCD-servo-burst-signal pattern, information that identifies a track, and error correction code information. In accessing the track, the read element of the magnetic-recording head 21 of HGA reads the servo-burst-signal pattern which provides a position-error-signal (PES) to the servo electronics, which controls the electrical signal provided to the voice-coil assembly 22 of VCM 4, enabling the magnetic-recording head 21 to follow the track. Upon finding the track and identifying a particular sectored track portion, the magnetic-recording head 21 either reads data from the track, or writes data to, the track depending on instructions received by the HDC from an external agent, for example, a microprocessor of a computer system.

Figure 2A:
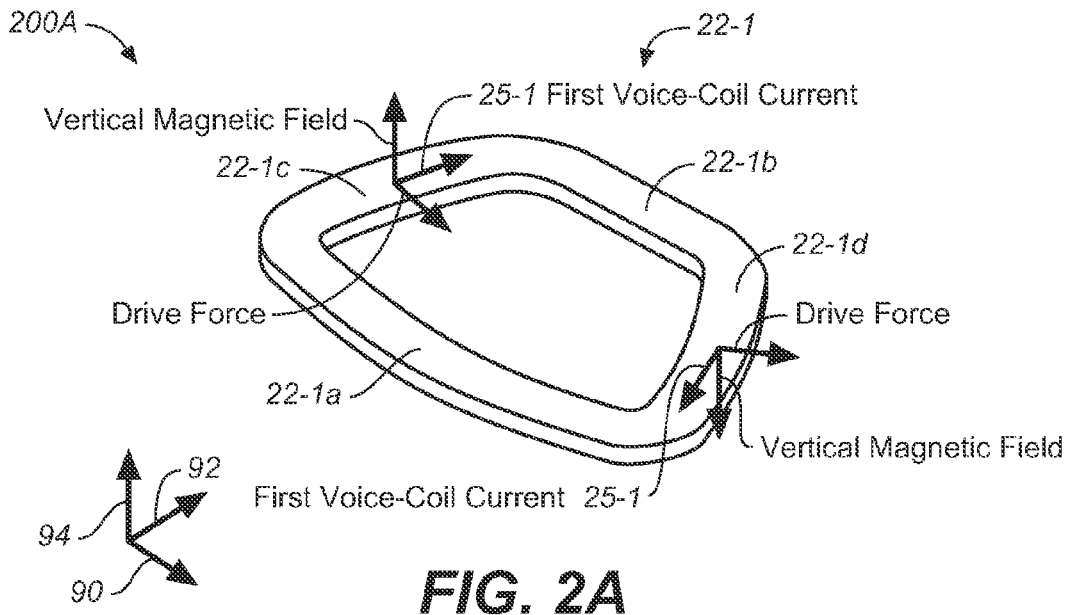
FIG. 2A is a perspective view of a first voice coil of the HDD of FIG. 1, in accordance with one or more embodiments of the present invention.
Figure 2B:
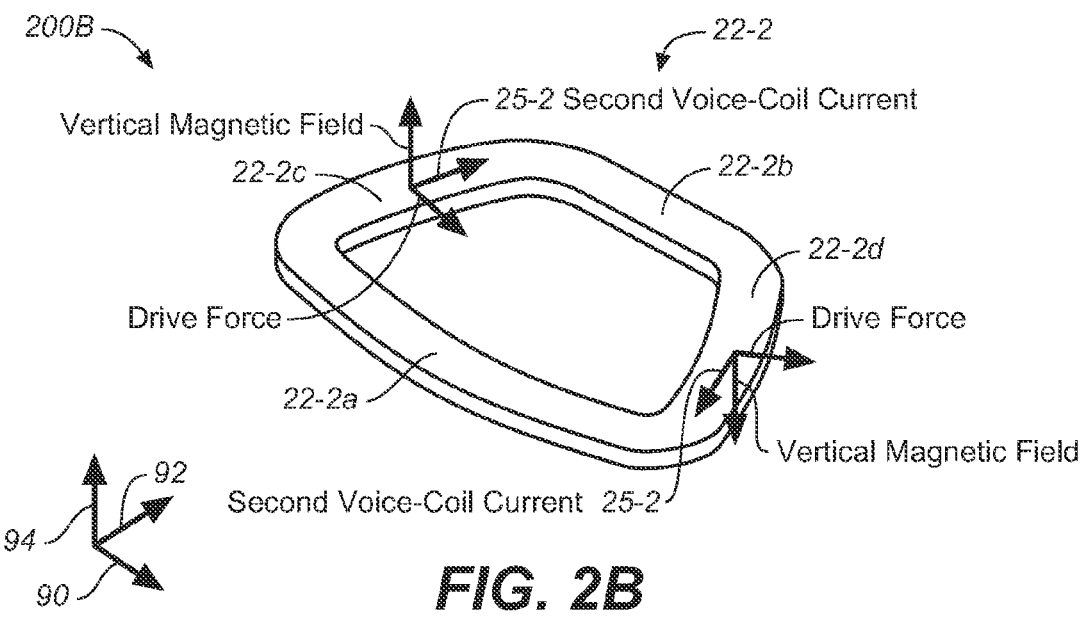
FIG. 2B is a perspective view of a second voice coil of the HDD of FIG. 1, in accordance with one or more embodiments of the present invention.
Figure 3:
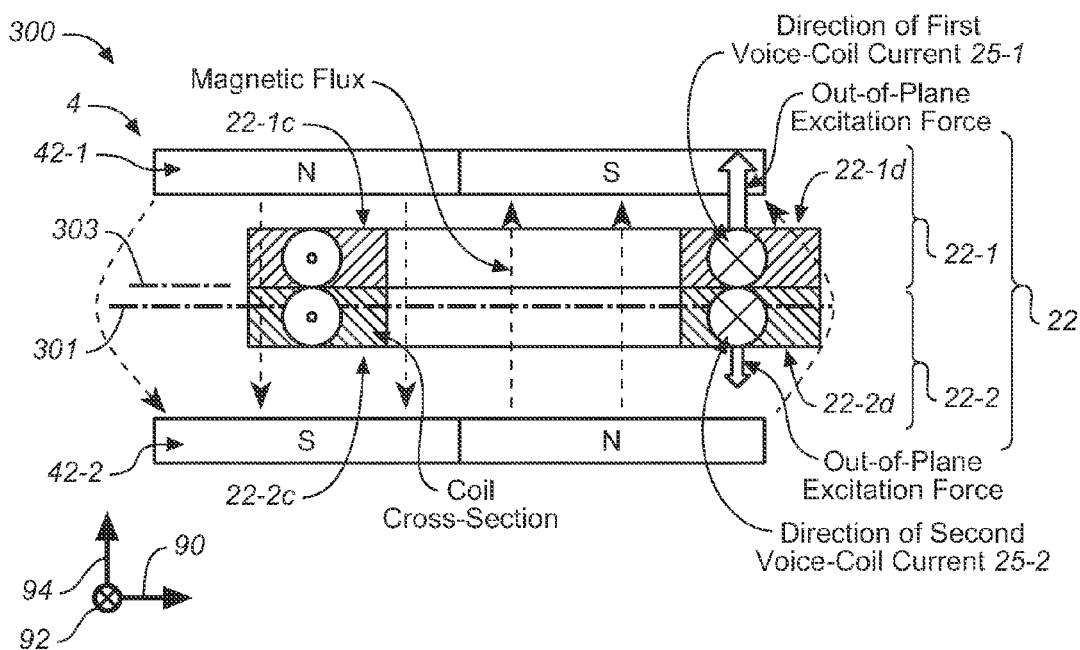
FIG. 3 is a cross-sectional elevation view of a voice-coil motor (VCM) including the first and second voice coils and of FIGS. 2A and 2B of a voice-coil assembly, and first and second VCM magnets, showing out-of-plane excitation forces exerted on the first and second voice coils and that are suppressed, in accordance with one or more embodiments of the present invention.

With reference now to FIGS. 2A, 2B and 3 and further reference to FIG. 1 embodiments of the present invention encompass within their scope, a disk drive, for example, HDD 101, that includes: at least one head, for example, magnetic-recording head 21; at least one disk, for example, magnetic-recording disk 1, rotatably mounted in the disk drive; a rotary actuator 2 coupled with the head at a distal end of the rotary actuator 2; and, a VCM 4. In accordance with embodiments of the present invention, the VCM 4 includes at least one VCM magnet, for example, one of VCM magnets 42-1 and 42-2 (see FIG. 3), and a voice-coil assembly 22. In accordance with embodiments of the present invention, the voice-coil assembly 22 is disposed in proximity to a magnetic pole of a VCM magnet, for example, one of VCM magnets 42-1 and 42-2 (see FIG. 3), and is disposed at a proximal end of the rotary actuator 2 opposite to the distal end, where the head is disposed. In accordance with embodiments of the present invention, the rotary actuator 2 may include the voice-coil assembly 22. In accordance with embodiments of the present invention, the voice-coil assembly 22 includes a first voice coil 22-1 and at least a second voice coil 22-2, without limitation thereto. Thus, in accordance with other embodiments of the present invention, a voice-coil assembly may also further include a plurality of voice coils including the first voice coil 22-1, the second voice coil 22-2, a third voice coil (22-3), and at least a fourth voice coil (22-4); the plurality of voice coils are similarly configured to embodiments of the present invention for the first voice coil 22-1 and the second voice coil 22-2, described herein, to reduce vibrations of the magnetic-recording head 21 when data is accessed on the magnetic-recording disk 1 in the HDD 101. The first voice coil 22-1 is disposed in proximity to a magnetic pole of the at least one voice-coil-motor magnet. The second voice coil 22-2 is disposed in close proximity to the first voice coil 22-1 such that the first voice coil 22-1 substantially overlays the second voice coil 22-2 (see FIGS. 3 and 4). In accordance with embodiments of the present invention, the rotary actuator 2 is configured to move the head, for example, magnetic-recording head 21, to access portions of the disk, for example, magnetic-recording disk 1, for writing data to, and reading data from, the disk. In accordance with embodiments of the present invention, the first voice coil 22-1 and the second voice coil 22-2 are configured to reduce vibrations of the head, for example, magnetic-recording head 21, when data is accessed on a disk, for example, magnetic-recording disk 1, in the disk drive, for example, HDD 101. As described above, embodiments of the present invention include within their spirit and scope: a disk drive, for example, HDD 101; a head, for example, magnetic-recording head 21; a disk, for example, magnetic-recording disk 1; and, a disk controller, for example, a hard-disk controller (HDC).

With reference now to FIGS. 2A and 2B, in accordance with embodiments of the present invention, perspective views 200A and 200B are shown of the first voice coil 22-1 and the second voice coil 22-2, respectively, of HDD 101. Triad of vectors 90, 92 and 94 indicates the orientation of the perspective view 200A with respect to the perspective view 100 of FIG. 1. As shown in FIGS. 2A and 2B, the portions of the first and second voice coils 22-1 and 22-2 that are parallel to the direction of rotation of the rotary actuator 2 about the pivot shaft 3 and further from the pivot shaft 3 are referred to as an outer peripheral portion 22-1a and of the first voice coil 22-1 and an outer peripheral portion 22-2a and of the second voice coil 22-2. Furthermore, the portions of the first and second voice coils 22-1 and 22-2 that are parallel to the direction of rotation of the rotary actuator 2 about the pivot shaft 3 and are close to the pivot shaft 3 are referred to as an inner peripheral portion 22-1b of the first voice coil 22-1 and an inner peripheral portion 22-2b and of the second voice coil 22-2. Furthermore, the two straight line portions of the first voice coil 22-1 that are substantially perpendicular to the direction of rotation of the rotary actuator 2 about the pivot shaft 3 are referred to below as a left straight-line portion 22-1c and a right straight-line portion 22-1d of the first voice coil 22-1; and, the two straight line portions of the second voice coil 22-2 that are substantially perpendicular to the direction of rotation of the rotary actuator 2 about the pivot shaft 3 are referred to below as a left straight-line portion 22-2c and a right straight-line portion 22-2d of the second voice coil 22-2.

With further reference to FIGS. 2A and 2B, in accordance with embodiments of the present invention, the turns of the first voice coil 22-1 are wound about a first voice-coil axis; and, turns of the second voice coil 22-2 are wound about a second voice-coil axis; the first voice-coil axis and the second voice-coil axis may be disposed about parallel to the pivot shaft 3 of the rotary actuator 2 upon assembly, and/or during operation, of HDD 101. The voice coils 22-1 and 22-2 may be described by the term of art, "pancake coil," because the turns of the voice coils 22-1 and 22-2 are disposed in a nearly planar configuration about the voice-coil axes; and, therefore, the term of art "plane of the voice coil," refers to a plane perpendicular to the voice-coil axis and near which the turns of a voice coil are disposed. Similarly, the terms of art, "in-plane," and "out-of-plane," refer to vectors, for example, drive forces, lying about in the plane of a voice coil, and vectors, for example, out-of-plane excitation forces, oriented about perpendicular to the plane of a voice coil, respectively. Moreover, the outer peripheral portion, the inner peripheral portion, the right straight-line portion and the left straight-line portion are disposed about along the sides of a trapezoid, as shown in FIGS. 2A and 2B, except for slight arcuate curvature of these portions in the plane of the voice coil. Therefore, in accordance with embodiments of the present invention, a form and a shape of the first and second voice coils 22-1 and 22-2 is that of a trapezoidal flattened annulus. Moreover, in accordance with embodiments of the present invention, the form and the shape of the second voice coil 22-2 are substantially identical to the form and the shape of the first voice coil 22-1, such that the first voice coil 22-1 may be figuratively referred to as a top half of the voice-coil assembly 22; and, the second voice coil 22-2, as a bottom half of the voice-coil assembly 22.

With reference to FIGS. 2A, 2B and 3, in accordance with embodiments of the present invention, the principle of operation of the VCM 4 is illustrated by which the voice-coil assembly 22 is moved by a drive force generated by interaction of currents flowing through the first voice coil 22-1 and the second voice coil 22-2 of the voice-coil assembly 22 with a magnetic field bridging the space between the VCM magnets 42-1 and 42-2 (see FIG. 3). In one embodiment of the present invention, the first voice coil 22-1 and the second voice coil 22-2 flow in the same sense around their respective voice coils 22-1 and 22-2, as proportionate portions of a VCM current. As used herein, the VCM current includes the first voice-coil current 25-1 and second voice-coil current 25-2; and, the VCM current may equal the sum of the first voice-coil current 25-1 and second voice-coil current 25-2, without limitation thereto. A clockwise, or alternatively counter-clockwise, direction of the voice-coil currents 25-1 and 25-2 causes the actuator to move in one direction, or alternatively, in an opposite direction, respectively. As a first voice-coil current 25-1 flows through the turns of the first voice coil 22-1, interaction of the first voice-coil current 25-1 with the vertical magnetic field bridging the space between the VCM magnets 42-1 and 42-2 generates a drive force on the first voice coil 22-1, which is proportional to the number of turns of the first voice coil 22-1, the first voice-coil current 25-1 and the vertical magnetic field produced by VCM magnets 42-1 and 42-2. Similarly, as a second voice-coil current 25-2 flows through the turns of the second voice coil 22-2, interaction of the second voice-coil current 25-2 with the vertical magnetic field bridging the space between the VCM magnets 42-1 and 42-2 generates a drive force on the second voice coil 22-2, which is proportional to the number of turns of the second voice coil 22-2, the second voice-coil current 25-2 and the vertical magnetic field produced by VCM magnets 42-1 and 42-2. However, if the magnetic field has a horizontal component, the current flowing in the portion of the coil lying in proximity to the horizontal component of the magnetic field produces an out-of-plane excitation force that is exerted on that portion of the coil, which is next described.

With reference now to FIG. 3, in accordance with embodiments of the present invention, a cross-sectional elevation view 300 of VCM 4 is shown. Triad of vectors 90, 92 and 94 indicates the orientation of the cross-sectional elevation view 300 with respect to the perspective view 100 of FIG. 1. In accordance with embodiments of the present invention, VCM 4 includes at least one VCM magnet, for example, one of VCM magnets 42-1 and 42-2, and the voice-coil assembly 22. The voice-coil assembly 22 includes the first voice coil 22-1 and the second voice coil 22-2. The first voice coil 22-1 is disposed in proximity to a magnetic pole of at least one voice-coil-motor magnet, for example, VCM magnet 42-1. The second voice coil 22-2 is disposed in close proximity to the first voice coil 22-1 such that the first voice coil 22-1 substantially overlays the second voice coil 22-2. The first voice coil 22-1 and the second voice coil 22-2 are configured to reduce vibrations of the magnetic-recording head 21 when data is accessed on the magnetic-recording disk 1 in HDD 101.

With further reference to FIG. 3, in accordance with embodiments of the present invention, the symbols "N" and "S" shown in FIG. 3 denote north and south poles, respectively, of the VCM magnets 42-1 and 42-2. As shown in FIG. 3, VCM magnet 42-1 has a north pole disposed to the left and top of the drawing, and a south pole disposed to the right and top of the drawing. In a similar manner, VCM magnet 42-2 has a south pole disposed to the left and bottom of the drawing, and a north pole disposed to the right and bottom of the drawing. As shown in FIG. 3, magnetic flux associated with the vertical magnetic fields produced by the VCM magnets 42-1 and 42-2 is shown as dashed vertical arrows directed from the north to the south poles of the VCM magnets 42-1 and 42-2. The VCM 4 may also be provided with a yoke (not shown) to which the VCM magnets 42-1 and 42-2 are coupled to complete a magnetic circuit. Moreover, the symbols "X" and "dot" shown in FIG. 3 denote tail and head, respectively, of vectors, which for vectors lying in the first and second voice coils 22-1 and 22-2 refer to the directions of the first voice-coil current 25-1 and the second voice-coil current 25-2 flowing in the first and second voice coils 22-1 and 22-2 of the voice-coil assembly 22. In FIG. 3, the cross-sectional area of the first and second voice coils 22-1 and 22-2 is denoted by hatching. In addition, a magnetic center 301 of the VCM 4 and neutral plane 303 of the voice-coil assembly 22 are denoted by dot-dashed horizontal lines.

With further reference to FIG. 3, with relevance for embodiments of the present invention, in a VCM including VCM magnets disposed above and below voice coils, respectively, if the neutral plane of the voice-coil assembly coincides with the magnetic center of the VCM, the out-of-plane excitation force exerted on the first and second voice coils may be reduced. However, as shown in FIG. 3, in the absence of further embodiments of the present invention subsequently described, out-of-plane excitation forces may be exerted on the first and second voice coils 22-1 and 22-2. If the neutral plane 303 of the voice-coil assembly 22 does not coincide with the magnetic center 301 of the VCM 4, because of variations in assembly of HDD 101 and rotary actuator 2, out-of-plane excitation forces may be exerted on the first and second voice coils 22-1 and 22-2. As shown in FIG. 3, a horizontal component of the magnetic field at the right side of the VCM 4 produces an upward out-of-plane excitation force on the right straight-line portion 22-1d of the first voice coil 22-1, and produces a downward out-of-plane excitation force on the right straight-line portion 22-2d of the second voice coil 22-2. Since the magnetic center 301 of the VCM 4 does not coincide with the neutral plane 303 of the voice-coil assembly 22, the sum of upward out-of-plane excitation force on the right straight-line portion 22-1d of the first voice coil 22-1 and the downward out-of-plane excitation force on the right straight-line portion 22-2d of the second voice coil 22-2 produces a net force acting on both the first and second voice coils 22-1 and 22-2 in a direction about parallel to the axes of the first and second voice coils 22-1 and 22-2, which is in the vertical direction of vector 94. Since there is negligible horizontal components in the magnetic field of the VCM 4 at the position at left side of FIG. 3 where the first and second voice coils 22-1 and 22-2 are located, negligible upward out-of-plane excitation force on the left straight-line portion 22-1c of the first voice coil 22-1 is produced, and negligible downward out-of-plane excitation force on the left straight-line portion 22-2c of the second voice coil 22-2 is produced. Consequently, an out-of-plane moment may be exerted on the first and second voice coils 22-1 and 22-2; and, the VCM current may excite out-of-plane structural resonances, such as bending and torsion, which result in deleterious vibration of the magnetic-recording head 21. The VCM 4 may no longer maintain stable control. In addition, the force which excites out-of-plane structural resonance in the range of movement of the first and second voice coils 22-1 and 22-2 varies; and, therefore, excitation of resonance may occur throughout the whole range of movement of the first and second voice coils 22-1 and 22-2.

On the other hand, with further reference to FIG. 3, in accordance with embodiments of the present invention, the first voice coil 22-1 and the second voice coil 22-2 may be configured as shown, such that if a first voice-coil current 25-1 applied to the first voice coil 22-1 produces an upward out-of-plane excitation force on the right straight-line portion 22-1d of the first voice coil 22-1, a greater second voice-coil current 25-2 may be applied to the second voice coil 22-2 to increase a downward out-of-plane excitation force on the right straight-line portion 22-2*d* of the second voice coil 22-2 to nullify the effect of upward out-of-plane excitation force on the right straight-line portion 22-1*d* of the first voice coil 22-1. Thus, in accordance with embodiments of the present invention, the sum of the component of force acting on the first voice coil 22-1 and the component of force acting on second voice coil 22-2 is reduced in the direction about parallel to the axes of the first and second voice coils 22-1 and 22-2, which is the vertical direction of vector 94, without limitation thereto. Since there is negligible horizontal components in the magnetic field of the VCM 4 at the position at left side of FIG. 3 where the first and second voice coils 22-1 and 22-2 are located, negligible upward out-of-plane excitation force on the left straight-line portion 22-1*c* of the first voice coil 22-1 is produced, and negligible downward out-of-plane excitation force on the left straight-line portion 22-2*c* of the second voice coil 22-2 is produced. Consequently, an out-of-plane moment is not produced in the first and second voice coils 22-1 and 22-2; and, the VCM current does not excite out-of-plane structural resonances, such as bending and torsion. Thus, in accordance with embodiments of the present invention, the VCM 4 maintains stable control. In addition, the net force which previously excited out-of-plane structural resonance in the range of movement of the first and second voice coils 22-1 and 22-2 can be nullified; and, therefore, excitation of resonance is suppressed throughout the whole range of movement of the first and second voice coils 22-1 and 22-2. However, the preceding discussion addressed only out-of-plane excitation forces associated with horizontal components in the magnetic field of the VCM 4 encountered upon motion of the voice-coil assembly 22 along the direction of vector 90, from left-to-right, or alternatively, from right-to-left. However, horizontal components in the magnetic field of the VCM 4 are also present at the inner peripheral and the outer peripheral portions of the voice-coil assembly 22, for example, the outer peripheral portion 22-la and of the first voice coil 22-1 and the outer peripheral portion 22-2*a* and of the second voice coil 22-2, as well as the inner peripheral portion 22-1*b* and of the first voice coil 22-1 and the inner peripheral portion 22-2*b* and of the second voice coil 22-2, the effects of which are next described.

Figure 4:
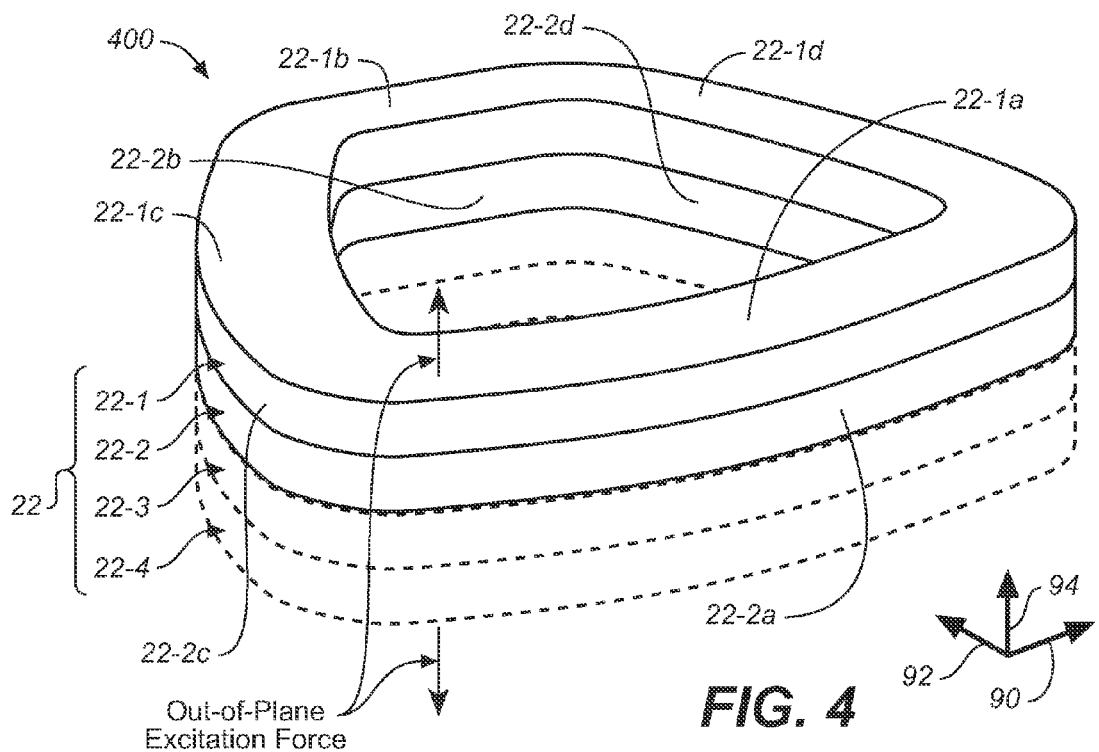
FIG. 4 is a perspective view of a wire-frame model of the voice-coil assembly, showing other out-of-plane excitation forces exerted on the first and second voice coils and that are suppressed, in accordance with one or more embodiments of the present invention.

With reference now to FIG. 4, with relevance for embodiments of the present invention, a perspective view 400 is shown of a wire-frame model of the voice-coil assembly 22. FIG. 4 shows other out-of-plane excitation forces that may be exerted on the first and second voice coils 22-1 and 22-2, but that are suppressed, in accordance with embodiments of the present invention. Triad of vectors 90, 92 and 94 indicates the orientation of the perspective view 400 with respect to the perspective view 100 of FIG. 1. As shown in FIG. 4, the voice-coil assembly 22 includes the first voice coil 22-1 and at least a second voice coil 22-2. However, in accordance with other embodiments of the present invention, a voice-coil assembly may further include a plurality of voice coils including the first voice coil 22-1, the second voice coil 22-2, a third voice coil (not shown), and at least a fourth voice coil (not shown); the plurality of voice coils are similarly configured to embodiments of the present invention for the first voice coil 22-1 and the second voice coil 22-2, described herein, to reduce vibrations of the magnetic-recording head 21 when data is accessed on the magnetic-recording disk 1 in the HDD 101. The first voice coil 22-1 includes the outer peripheral portion 22-1*a*, the inner peripheral portion 22-1*b*, the left straight-line portion 22-1*c* and the right straight-line portion 22-1*d*. The second voice coil 22-2 includes the outer peripheral portion 22-2*a*, the inner peripheral portion 22-2*b*, the left straight-line portion 22-2*c* and the right straight-line portion 22-2*d*. Moreover, in accordance with embodiments of the present invention, the form and the shape of the second voice coil 22-2 are substantially identical to the form and the shape of the first voice coil 22-1, and the second voice coil 22-2 is disposed in close proximity to the first voice coil 22-2 such that the first voice coil 22-1 substantially overlays the second voice coil 22-2 to produce a voice-coil assembly 22 with the form and shape of a trapezoidal flattened annulus, without limitation thereto. In accordance with embodiments of the present invention, this configuration of the first voice coil 22-1 and the second voice coil 22-2 may provide for reduction of vibrations of the magnetic-recording head 21 when data is accessed on a magnetic-recording disk 1 in HDD 101, as is next described.

With further reference to FIG. 4, with relevance for embodiments of the present invention, the magnetic flux from the outer periphery of the VCM magnets 42-1 and 42-2 situated furthest away from the center of rotation of the rotary actuator 2 is not perpendicular to the plane of the coil. Therefore, out-of-plane excitation forces may be produced at the outer peripheral portions of the voice-coil assembly 22, for example, the outer peripheral portion 22-1*a* of voice coil 22-1 and the outer peripheral portion 22-2*a* of voice coil 22-2. Similarly, as shown in FIG. 4, out-of-plane excitation forces, but of substantially lesser magnitude as shown, may be produced at the inner peripheral portions of the voice-coil assembly 22, for example, the inner peripheral portion 22-1*b* of voice coil 22-1 and the inner peripheral portion 22-2*b* of voice coil 22-2. But for embodiments of the present invention, these out-of-plane excitation forces would become one cause of noise and settling vibration. Also as shown in FIG. 4, the orientations of the currents applied to the first and second voice coils 22-1 and 22-2 are the same. However, in accordance with embodiments of the present invention, the magnitudes of current applied to the first and second voice coils 22-1 and 22-2 are not equal; and, the proportions of the magnitudes of current for the first and second voice coils 22-1 and 22-2 may be adjusted in such a way that there is little excitation of structural resonance, such as bending and torsion. Thus, in accordance with embodiments of the present invention, the first voice coil 22-1 and the second voice coil 22-2 are configured such that if a first voice-coil current 25-1 is applied to the first voice coil 22-1, a second voice-coil current 25-2 that is applied to the second voice coil 22-2 can reduce a sum of a component of force acting on the first voice coil 22-1 and a component of force acting on second voice coil 22-2 in a direction about parallel to the axes of the first and second voice coils 22-1 and 22-2. Moreover, in accordance with embodiments of the present invention, the sum of the first voice-coil current 25-1 and the second voice-coil current 25-2 is constant over a total range of motion of the rotary actuator 2. In another embodiment of the present invention, the sum of the first voice-coil current 25-1 and the second voice-coil current 25-2 may be adjusted to provide uniform rotational motion over a total range of motion of the rotary actuator 2. In yet another embodiment of the present invention, the proportions of VCM current in the first voice coil 22-1 and the second voice coil 22-2 are adjusted to reduce structural resonances excited in the first and second voice coils 22-1 and 22-2. Thus, in accordance with embodiments of the present invention, the first voice coil 22-1 and the second voice coil 22-2 are configured to suppress a torsional structural resonance of the first and second voice coils 22-1 and 22-2 when data is accessed on the magnetic-recording disk 1 in HDD 101.

Figure 5:
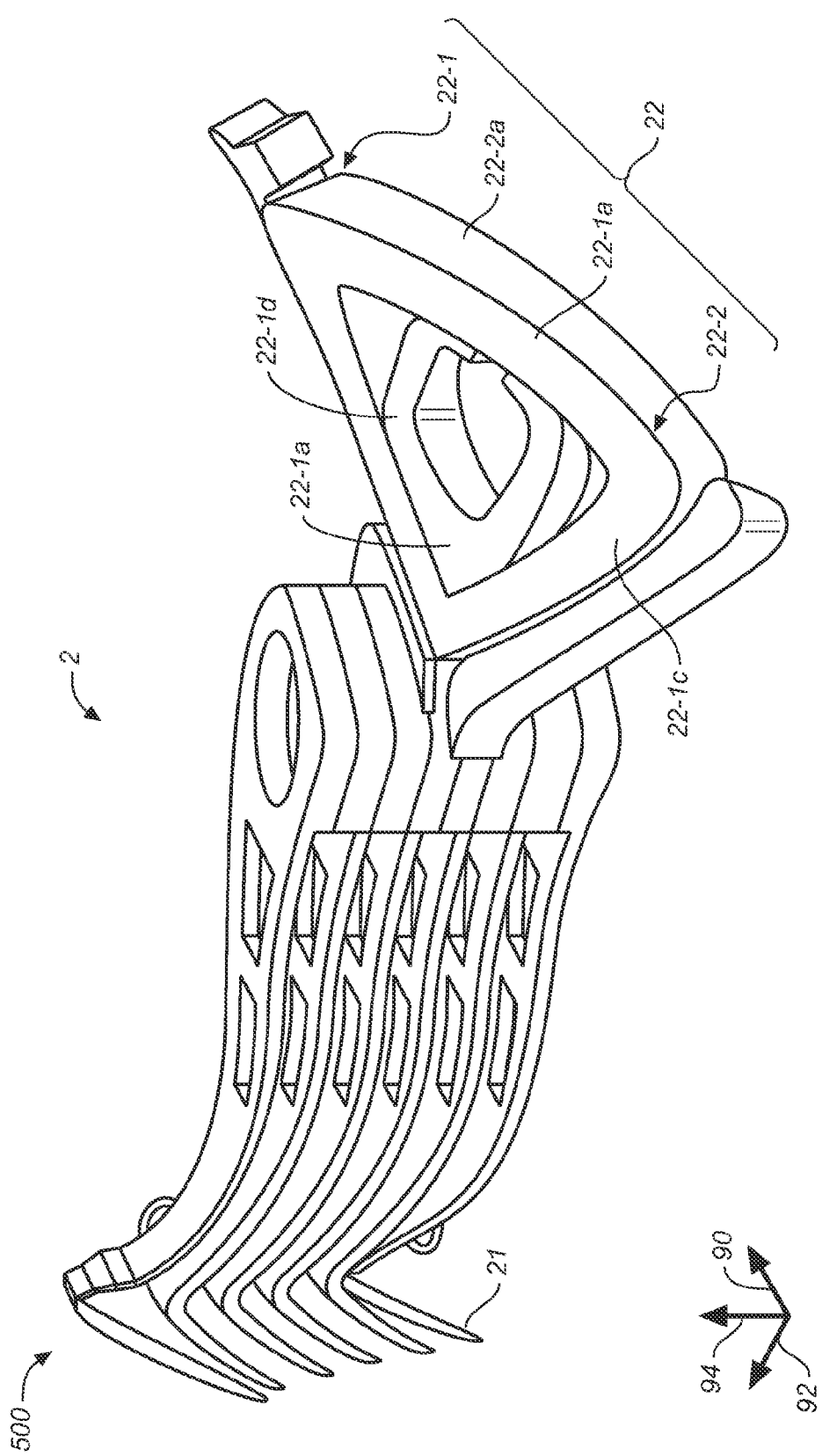
FIG. 5 is a perspective view of a polygonal-mesh model of a rotary actuator including the voice-coil assembly of FIG. 4, showing a shape change induced by a torsional structural resonance that is suppressed, in accordance with one or more embodiments of the present invention.

With reference now to FIG. 5, with relevance for embodiments of the present invention, a perspective view 500 is shown of a polygonal-mesh model of a rotary actuator 2 including the voice-coil assembly 22 of FIG. 4. FIG. 5 shows a shape change induced by the torsional structural resonance that is suppressed, in accordance with embodiments of the present invention. Triad of vectors 90, 92 and 94 indicates the orientation of the perspective view 500 with respect to the perspective view 100 of FIG. 1. In accordance with embodiments of the present invention, the rotary actuator 2 is configured to reduce vibrations of the magnetic-recording head 21 when data is accessed on the magnetic-recording disk 1 in HDD 101. The rotary actuator 2 includes a voice-coil assembly 22. The voice-coil assembly includes a first voice coil 22-1 and at least a second voice coil 22-2. Because the bottom of the voice-coil assembly 22 is hidden from view, only the outer peripheral portion 22-2a of the first voice coil 22-1 is shown; but, the outer peripheral portion 22-1a, the inner peripheral portion 22-1b, the left straight-line portion 22-1c and the right straight-line portion 22-1d of the first voice coil 22-1 are shown, in FIG. 5. The second voice coil 22-2 is disposed in close proximity to the first voice coil 22-1 such that the first voice coil 22-1 substantially overlays the second voice coil 22-2; and, the head is coupled with the rotary actuator 2 at a distal end of the rotary actuator 2, as previously described. The first voice coil 22-1 and the second voice coil 22-2 are disposed at a proximal end of the rotary actuator 2 opposite to the distal end. In accordance with embodiments of the present invention, the first voice coil 22-1 and the second voice coil 22-2 are configured to reduce vibrations of the magnetic-recording head 21 when data is accessed on the magnetic-recording disk 1 in HDD 101.

With further reference to FIG. 5, with relevance for embodiments of the present invention, if the out-of-plane excitation force exerted on the first coil 22-1 is greater than that exerted on the second coil 22-2, the magnitude of the first voice-coil current 25-1 may be made less than the magnitude of the second voice-coil current 25-2, such that the torsional moment exerted on the first and second voice coils 22-1 and 22-2 is reduced in accordance with embodiments of the present invention. The proportions of the magnitudes of first and second voice-coil currents 25-1 and 25-2 applied to the first and second voice coils 22-1 and 22-2 may be adjusted in such a way that there is little excitation of a torsional structural resonance mode, which is shown in FIG. 5 for purposes of illustration. In accordance with embodiments of the present invention, the excitation of a torsional structural resonance mode may be reduced over the entire range of movement of the voice-coil assembly 22. Moreover, in yet other embodiments of the present invention, variations in the proportions of the magnitudes of first and second voice-coil currents 25-1 and 25-2 applied to the first and second voice coils 22-1 and 22-2 may be adjusted depending on the position of the magnetic-recording head 21; and, these variations in the proportions of the magnitudes of first and second voice-coil currents 25-1 and 25-2 that depend on the position of the magnetic-recording head 21 may be saved by, or alternatively retrieved by, a HDC as control data, which are table values in a memory configured to provide a look-up table containing the control data. Furthermore, in yet another embodiment of the present invention, the sum of the magnitudes of the first and second voice-coil currents 25-1 and 25-2 applied to the first and second voice coils 22-1 and 22-2 is constant for the range of movement of the first and second voice coils 22-1 and 22-2. Moreover, in yet another embodiment of the present invention, if the sum of the magnitudes of the first and second voice-coil currents 25-1 and 25-2 applied to the first and second voice coils 22-1 and 22-2 is constant over the range of movement of the first and second voice coils 22-1 and 22-2, uniform rotational moment of the rotary actuator 2 may be achieved over the range of movement. By way of example, in accordance with embodiments of the present invention, the first and second voice coils 22-1 and 22-2 may have the same form and shape, without limitation thereto; but, embodiments of the present invention also include within their spirit and scope first and second voice coils 22-1 and 22-2 having different shapes. A method for adjusting the proportions of VCM current applied to the first and second voice coils 22-1 and 22-2 are next described.

Figure 6:
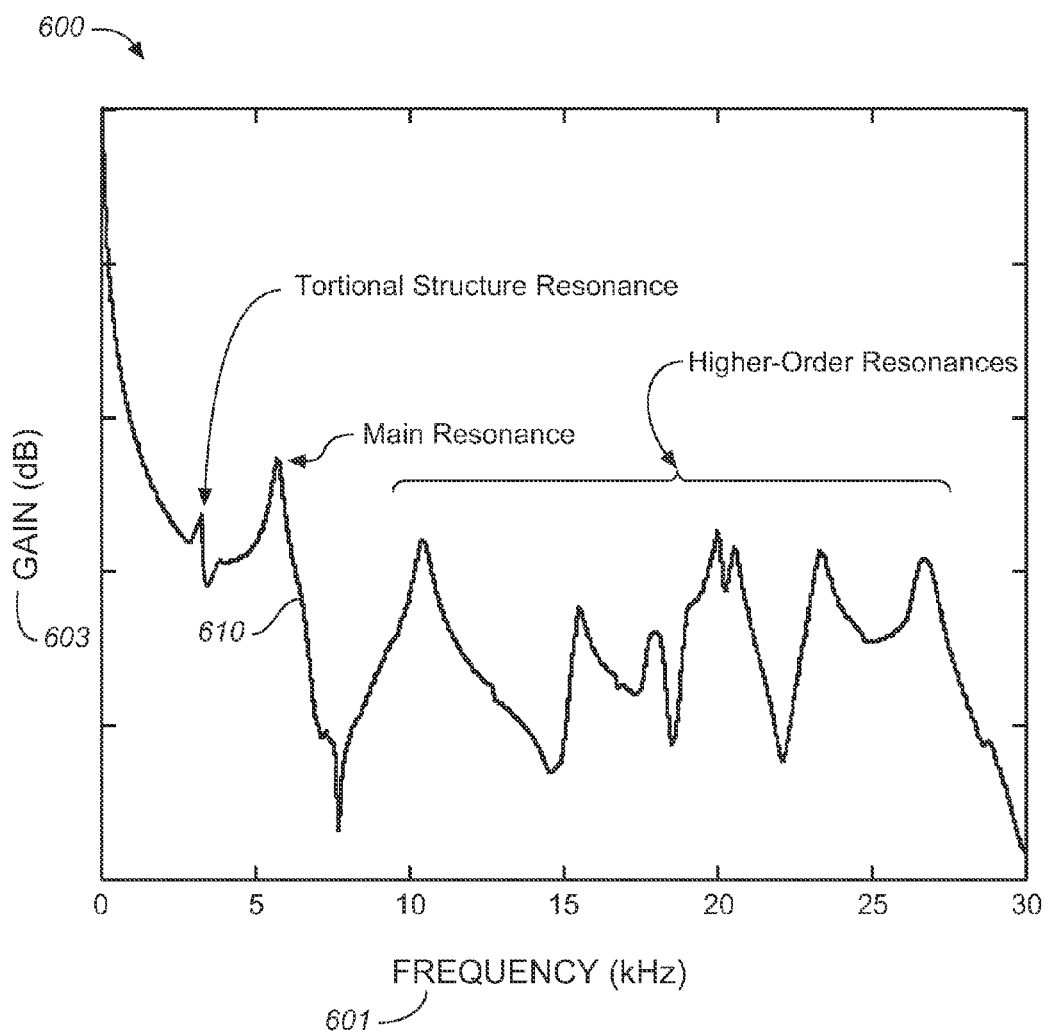
FIG. 6 is a plot of a transfer function for magnetic-recording-head displacement as a function of frequency response of the rotary actuator to the applied VCM current that is used for determining values of modal participation factors of the first and second voice coils and for suppression of the torsional structural resonance, in accordance with one or more embodiments of the present invention.

With reference now to FIG. 6, in accordance with embodiments of the present invention, a plot 600 is shown of a transfer function 610 for magnetic-recording-head displacement as a function of frequency response of the rotary actuator 2 to the applied VCM current. The ordinate of the plot 600 of the transfer function 610 is gain 603 in decibels (dB); and, the abscissa, frequency 601 in kilohertz (kHz). The transfer function exhibits a torsional structural resonance, a main resonance, and higher order resonances appearing in the magnetic-recording-head displacement. The transfer function is used for determining values of modal participation factors of the first and second voice coils 22-1 and 22-2, for suppression of the torsional structural resonance. FIG. 6 shows the transfer function from the VCM current to the magnetic-recording head 21. In accordance with embodiments of the present invention, modal participation factors that are excited by the respective voice coils 22-1 and 22-2 may be obtained by applying a constant test current separately to the first and second voice coils 22-1 and 22-2 at the frequency of the torsional structural resonance in the transfer function. The modal participations factors for the first coil and second voice coils are denoted by, $\alpha$, and $\beta$, respectively; but, the proportions of magnitudes of VCM current flowing to the first and second voice coils 22-1 and 22-2 are the opposite, being: $\beta$ and $\alpha$, respectively. Furthermore, if the sum of $\alpha$ and $\beta$ is constant in the range of movement of the rotary actuator 2, the rotational moment in the range of movement can be kept constant. By adjusting these voice-coil current values, the excitation of torsional structural resonance is reduced and stable control of the movement of rotary actuator 2 may be provided.

With further reference to FIGS. 1 and 6, in accordance with embodiments of the present invention, the HDD 101 may further include a HDC 23 and a memory 24 configured to provide a look-up table. The HDC is configured to retrieve control data from the look-up table used to adjust the first voice-coil current 25-1 applied to the first voice coil 22-1 to a first proportion of VCM current and to adjust the second voice-coil current 25-2 applied to the second voice coil 22-2 to a second proportion of VCM current to reduce torsional moments on the first and second voice coils 22-1 and 22-2. In accordance with embodiments of the present invention, the control data includes a first modal participation factor, $\alpha$, associated with the first voice coil 22-1, and a second modal participation factor, $\beta$, associated with the second voice coil 22-2. The first modal participation factor, $\alpha$, is determined by a first percentage contribution to amplitude of a torsional structural resonance of the first and second voice coils 22-1 and 22-2 upon applying a first test current of a given amplitude to the first voice coil 22-1 at a resonant frequency associated with the torsional structural resonance. Similarly, the second modal participation factor, $\beta$, is determined by a second percentage contribution to the amplitude of the torsional structural resonance of the first and second voice coils 22-1 and 22-2 upon applying a second test current of a given amplitude to the second voice coil 22-2 at the resonant frequency associated with the torsional structural resonance. In accordance with embodiments of the present invention, the HDC is configured to adjust the first proportion of VCM current in proportion to a value given by the second modal participation factor β and to adjust the second proportion of VCM current in proportion to a value given by the first modal participation factor, α. In accordance with embodiments of the present invention, the sum of the first proportion of VCM current and the second proportion of VCM current is constant over a total range of movement of the rotary actuator 2.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A voice-coil motor with voice coils configured to reduce vibrations of a head when data is accessed on a disk in a disk drive, said voice-coil motor comprising:
    at least one voice-coil-motor magnet; and
    a voice-coil assembly comprising:
        a first voice coil with an inner, outer, left, and right peripheral portion disposed in proximity to a magnetic pole of said voice-coil-motor magnet; and
        at least a second voice coil with an inner, outer, left, and right peripheral portion disposed in close proximity to said first voice coil such that said inner, outer, left, and right peripheral portions of said first voice coil substantially overlays said inner, outer, left, and right peripheral portions of said second voice coil;
    wherein said first voice coil and said second voice coil are configured to reduce vibrations of said head when data is accessed on a disk in said disk drive.

2. The voice-coil motor of claim 1, wherein said voice-coil assembly further comprises a plurality of voice coils comprising said first voice coil, said second voice coil, a third voice coil, and at least a fourth voice coil;
    wherein said plurality of voice coils are configured to reduce vibrations of said head when data is accessed on said disk in said disk drive.

3. The voice-coil motor of claim 1, wherein turns of said first voice coil and turns of said second voice coil are wound about an axis that may be disposed about parallel to a pivot shaft of a rotary actuator in said disk drive; and
    wherein said first voice coil and said second voice coil are configured such that if a first voice-coil current is applied to said first voice coil, a second voice-coil current that is applied to said second voice coil can reduce a sum of a component of force acting on said first voice coil and a component of force acting on second voice coil in a direction about parallel to said axes of said first and second voice coils.

4. The voice-coil motor of claim 1, wherein a form and a shape of said second voice coil are substantially identical to a form and a shape of said first voice coil.

5. The disk drive of claim 4, wherein said form and said shape of said first and second voice coils is that of a trapezoidal flattened annulus.

6. The voice-coil motor of claim 1, wherein said first voice coil and said second voice coil are configured to suppress a torsional structural resonance of said first and second voice coils when data is accessed on a disk in said disk drive.

7. A rotary actuator configured to reduce vibrations of a head when data is accessed on a disk in a disk drive, said rotary actuator comprising:
    a voice-coil assembly comprising:
        a first voice coil with an inner, outer, left, and right peripheral portion; and
        at least a second voice coil with an inner, outer, left, and right peripheral portion disposed in close proximity to said first voice coil such that said inner, outer, left, and right peripheral portions of said first voice coil substantially overlays said inner, outer, left, and right peripheral portions of said second voice coil;
    wherein a head is coupled with said rotary actuator at a distal end of said rotary actuator, and said first voice coil and said second voice coil are disposed at a proximal end of said rotary actuator opposite to said distal end; and
    wherein said first voice coil and said second voice coil are configured to reduce vibrations of said head when data is accessed on a disk in said disk drive.

8. The rotary actuator of claim 7, wherein said voice-coil assembly further comprises a plurality of voice coils comprising said first voice coil, said second voice coil, a third voice coil, and at least a fourth voice coil;
    wherein said plurality of voice coils are configured to reduce vibrations of said head when data is accessed on said disk in said disk drive.

9. The rotary actuator of claim 7, wherein turns of said first voice coil and turns of said second voice coil are wound about an axis that may be disposed about parallel to a pivot shaft of said rotary actuator in said disk drive; and
    wherein said first voice coil and said second voice coil are configured such that if a first voice-coil current is applied to said first voice coil, a second voice-coil current that is applied to said second voice coil can reduce a sum of a component of force acting on said first voice coil and a component of force acting on second voice coil in a direction about parallel to said axes of said first and second voice coils.

10. The rotary actuator of claim 7, wherein a form and a shape of said second voice coil are substantially identical to a form and a shape of said first voice coil.

11. The disk drive of claim 10, wherein said form and said shape of said first and second voice coils is that of a trapezoidal flattened annulus.

12. The rotary actuator of claim 7, wherein said first voice coil and said second voice coil are configured to suppress a torsional structural resonance of said first and second voice coils when data is accessed on a disk in said disk drive.

13. A disk drive, comprising:
    at least one head;
    at least one disk rotatably mounted in said disk drive;
    a rotary actuator coupled with said head at a distal end of said rotary actuator;
        wherein said rotary actuator is configured to move said head to access portions of said disk for writing data to, and reading data from, said disk; and
    a voice-coil motor, comprising:
        at least one voice-coil-motor magnet; and
        a voice-coil assembly comprising:
            a first voice coil with an inner, outer, left, and right peripheral portion disposed in proximity to a magnetic pole of said voice-coil-motor magnet;

at least a second voice coil with an inner, outer, left, and right peripheral portion disposed in close proximity to said first voice coil such that said inner, outer, left, and right peripheral portions of said first voice coil substantially overlays said inner, outer, left, and right peripheral portions of said second voice coil;

wherein said first voice coil and said second voice coil are disposed at a proximal end of said rotary actuator opposite to said distal end, and are configured to reduce vibrations of said head when data is accessed on said disk in said disk drive.

14. The disk drive of claim 13, wherein said voice-coil assembly further comprises a plurality of voice coils comprising said first voice coil, said second voice coil, a third voice coil, and at least a fourth voice coil;

wherein said plurality of voice coils are configured to reduce vibrations of said head when data is accessed on said disk in said disk drive.

15. The disk drive of claim 13, wherein a form and a shape of said second voice coil are substantially identical to a form and a shape of said first voice coil.

16. The disk drive of claim 15, wherein said form and said shape of said first and second voice coils is that of a trapezoidal flattened annulus.

17. The disk drive of claim 13, wherein said first voice coil and said second voice coil are configured to suppress a torsional structural resonance of said first and second voice coils when data is accessed on a disk in said disk drive.

18. The disk drive of claim 13, wherein turns of said first voice coil and turns of said second voice coil are wound about an axis that may be disposed about parallel to a pivot shaft of said rotary actuator in said disk drive; and wherein said first voice coil and said second voice coil are configured such that if a first voice-coil current is applied to said first voice coil, a second voice-coil current that is applied to said second voice coil can reduce a sum of a component of force acting on said first voice coil and a component of force acting on second voice coil in a direction about parallel to said axes of said first and second voice coils.

19. The disk drive of claim 18, wherein a sum of said first voice-coil current and said second voice-coil current is constant over a range of motion of said rotary actuator.

20. The disk drive of claim 18, wherein a sum of said first voice-coil current and said second voice-coil current is adjusted to provide uniform rotational motion over a range of motion of said rotary actuator.

21. The disk drive of claim 13, further comprising:
a disk controller; and
a memory configured to provide a look-up table;
wherein said disk controller is configured to retrieve control data from said look-up table used to adjust a first voice-coil current to a first proportion of voice-coil-motor current and to adjust a second voice-coil current to a second proportion of voice-coil-motor current to reduce torsional moments on said first and second voice coils.

22. The disk drive of claim 21, wherein said control data comprises:
a first modal participation factor, $\alpha$, associated with said first voice coil; and
a second modal participation factor, $\beta$, associated with said second voice coil;
wherein said first modal participation factor, $\alpha$, is determined by a first percentage contribution to an amplitude of a torsional structural resonance of said first and second voice coils upon applying a first test current of a given amplitude to said first voice coil at a resonant frequency associated with said torsional structural resonance; and
wherein said second modal participation factor, $\beta$, is determined by a second percentage contribution to said amplitude of said torsional structural resonance of said first and second voice coils upon applying a second test current of a given amplitude to said second voice coil at said resonant frequency associated with said torsional structural resonance.

23. The disk drive of claim 22, wherein said disk controller is configured to adjust said first proportion of voice-coil-motor current in proportion to a value given by said second modal participation factor, $\beta$, and to adjust said second proportion of voice-coil-motor current in proportion to a value given by said first modal participation factor, $\alpha$.

24. The disk drive of claim 21, wherein a sum of said first proportion of voice-coil-motor current and said second proportion of voice-coil-motor current is constant over a range of movement of said rotary actuator.

25. The disk drive of claim 13, wherein proportions of voice-coil-motor current in said first voice coil and said second voice coil are adjusted to reduce structural resonances excited in said first and second voice coils.

* * * * *